US007911716B1

(12) United States Patent
Lu et al.

(10) Patent No.: US 7,911,716 B1
(45) Date of Patent: Mar. 22, 2011

(54) LENS MODULE

(75) Inventors: Yi-Tien Lu, Hsinchu (TW); Yu-Tsung Lee, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/780,189

(22) Filed: May 14, 2010

(51) Int. Cl.
*G02B 9/14* (2006.01)
*G02B 9/00* (2006.01)

(52) U.S. Cl. ........................ 359/785; 359/651

(58) Field of Classification Search .......... 359/649–651, 359/785
See application file for complete search history.

(56) References Cited

U.S. PATENT DOCUMENTS

| 4,679,913 A | 7/1987 | Sato et al. |
| 4,993,814 A | 2/1991 | Hata |
| 5,233,474 A | 8/1993 | Hirakawa |
| 5,412,508 A | 5/1995 | Lin |
| 5,796,528 A | 8/1998 | Mihara |
| 6,301,056 B1 * | 10/2001 | Kreitzer ........................ 359/649 |
| 6,747,816 B2 | 6/2004 | Sato |
| 2003/0161050 A1 | 8/2003 | Sato et al. |

FOREIGN PATENT DOCUMENTS

TW M362997 8/2009

* cited by examiner

*Primary Examiner* — William C Choi
(74) *Attorney, Agent, or Firm* — J.C. Patents

(57) ABSTRACT

A lens module including a first lens group, a second lens group, a third lens group, and an aperture stop is provided. The first lens group disposed between a magnified side and a reduced side has a positive refractive power. The second lens group disposed between the first lens group and the reduced side has a negative refractive power. The third lens group disposed between the second lens group and the reduced side has a positive refractive power. The aperture stop is disposed between the first lens group and the second lens group. Additionally, the distance from a center of the second surface to a center of the third surface is $L_1$, an effective focal length is f, and the lens module satisfies $0.4 < L_1/f < 1.2$.

18 Claims, 4 Drawing Sheets

LENS MODULE

CROSS-REFERENCE TO RELATED APPLICATION

This application claims the priority benefit of Taiwan application serial no. 99103357, filed on Feb. 4, 2010. The entirety of the above-mentioned patent application is hereby incorporated by reference herein and made a part of specification.

BACKGROUND OF THE INVENTION

1. Field of the Invention

The invention generally relates to a lens, and more particularly, to a fixed-focus lens module.

2. Description of Related Art

In recent years, digital display apparatuses such as liquid crystal displays (LCDs), digital light processings (DLPs), and plasma display panels (PDPs) have gradually replaced conventional cathode ray tubes (CRTs), and are widely adopted in new display apparatuses. Since digital video signals can be transmitted and processed without distortion, applying digital display apparatuses in projection display apparatuses (such as rear projection digital display apparatuses) has become the mainstream in the market. However, adopting lens modules in projection display apparatuses is challenging for optical designers.

For example, in order to represent superior imaging quality, the lens module used in conventional projection display apparatus usually has features of small distortion and image aberration, high definition, high contrast ratio, and uniform luminance. Moreover, these high quality projection display apparatuses not only have superior imaging quality, but also include larger viewing angles to satisfy the requirement for projecting large frames in a small space. Furthermore, in order to enhance light source utilization and frame luminance uniformity, the main light beam at the reduced side of the lens module and the optical axis thereof should be as parallel to each other as possible. That is, a telecentric angle of the main light beam at the reduced side relative to the optical axis should be as small as possible.

An optical module disclosed in Taiwan Patent No. M362997 includes a front lens group and a rear lens group. The front lens group includes a first lens, a second lens, and a third lens. The first lens has a biconcave shape. The second lens has a positive refractive power and a lens surface on an image side is a convex surface. The third lens has a positive refractive power and a lens surface on an object side is a convex surface. The rear lens group includes a fourth lens and a fifth lens sequentially from the object side. The fourth lens has a negative refractive power and a lens surface on the image side is a concave surface. The fifth lens has a biconcave shape. The optical module has high environment tolerability.

In FIG. 1 of U.S. Pat. No. 6,747,816, a four-piece wide-viewing angle lens is disclosed. The refractive powers of the four-piece lens from the object side to the image side are negative, positive, negative and positive sequentially. Herein, a surface of a first piece of lens facing the object side is a concave surface, and at least one surface of a second piece of lens is an aspherical surface. A surface of a fourth piece of lens facing the image side is a convex surface, and at least one surface of the fourth piece of lens is an aspherical surface. In addition, a two-group four-piece zoom lens is disclosed in FIGS. 8 and 9 of U.S. Pat. No. 4,993,814. This zoom lens includes a first lens group (a lens having a negative refractive power) and a second lens group (assembled by lenses having positive, negative and positive refractive powers respectively). An aperture stop is located between the first lens group and the second lens group.

A two-group five-piece zoom lens disclosed in FIG. 1 of U.S. Pat. No. 5,233,474 includes a first lens group and a second lens group. An aperture stop is located between a third piece of lens and a four piece of lens of the second lens group, and a surface of the four piece of lens facing the magnified side is an aspherical surface. Furthermore, a two-group five-piece wide-viewing angle lens disclosed in FIG. 6 of U.S. Pat. No. 5,796,528 includes a first lens group and a second lens group. An aperture stop is located between the first lens group and the second lens group. Similarly, a two-group lens is disclosed in U.S. Pat. No. 5,412,508 and U.S. Pat. No. 4,679,913. A four-piece fixed-focus lens is disclosed in US Patent Publication No. 20030161050.

SUMMARY OF THE INVENTION

The invention is directed to a lens module having small volume and superior imaging quality.

Other advantages of the invention can be further illustrated by the technical features broadly embodied and described as follows.

In order to achieve one or a part of or all of the above advantages or other advantages, an embodiment of the invention provides a lens module. The lens module includes a first lens group, a second lens group, a third lens group, and an aperture stop. The first lens group is disposed between a magnified side and a reduced side, and has a positive refractive power. The first lens group includes in sequence from the magnified side to the reduced side: a first sub-lens group having a negative refractive power and a second sub-lens group having a positive refractive power. Here, the first sub-lens group has a first lens, and a first surface of the first lens facing the magnified side is a concave surface. The second sub-lens group has a second lens. The second lens group is disposed between the first lens group and the reduced side, and the second lens group has a negative refractive power. The second lens group includes in sequence from the magnified side to the reduced side: a third lens having a positive refractive power and a fourth lens having a negative refractive power. A surface of the lens closest to the reduced side in the second lens group is a second surface. The third lens group is disposed between the second lens group and the reduced side, and has a positive refractive power. The third lens group includes a fifth lens. A surface of the lens closest to the magnified side in the third lens group is a third surface. The aperture stop is disposed between the second sub-lens group and the second lens group. An effective focal length (EFL) of the lens module is f, a distance from the center of the second surface to the center of the third surface is $L_1$, and the lens module satisfies $0.4 < L_1/f < 1.2$.

In an embodiment of the invention, the second surface is a concave surface.

In an embodiment of the invention, at least one of the first lens, the second lens, the third lens, the fourth lens, and the fifth lens is an aspherical lens.

In an embodiment of the invention, a curvature radius of a surface of the fourth lens facing the magnified side is $R_1$, a curvature radius of a surface of the fourth lens facing the reduced side is $R_2$, and the lens module satisfies $0.7 < (|R_1| + R_2)/(|R_1| - R_2) < 4$.

In an embodiment of the invention, the third lens has an Abbe number $v_P$, the fourth lens has an Abbe number $v_N$ $v_N$, and the lens module satisfies $20 < v_P - v_N < 30$.

In an embodiment of the invention, an effective focal length of the first sub-lens group is $f_{SG1}$, an effective focal length of the second sub-lens group is $f_{SG2}$, and the lens module satisfies $0.5<|f_{SG1}|/f<4.1$ and $0.3<f_{SG2}/f<0.95$.

In an embodiment of the invention, an effective focal length of the third lens is $f_3$, an effective focal length of the fourth lens is $f_4$, and the lens module satisfies $0.5<f_3/f<2$ and $0.35<|f_4|/f<0.9$.

In an embodiment of the invention, an effective focal length of the third lens group is $f_{G3}$, and the lens module satisfies $0.8<f_{G3}/f<2$.

In an embodiment of the invention, the first lens has a negative refractive power and the second lens has a positive refractive power.

In an embodiment of the invention, a surface of the first lens-group closest to the magnified side is a concave surface and a surface of the second lens-group closest to the magnified side is a convex surface.

In an embodiment of the invention, the fifth lens has a positive refractive power, and a surface of the fifth lens facing the magnified side is a convex surface.

In an embodiment of the invention, the second sub-lens group further comprises a sixth lens disposed between the second lens and the aperture stop. In an embodiment of the invention, the first lens has a negative refractive power, the second lens has a positive refractive power, and the sixth lens has a positive refractive power. In an embodiment of the invention, a surface of the sixth lens facing the magnified side is a convex surface. Besides, a surface of the third lens facing the magnified side is a convex surface and a surface of the fourth lens facing the reduced side is a concave surface. In an embodiment of the invention, at least one of the first lens, the second lens, the third lens, the fourth lens, the fifth lens, and the sixth lens is an aspherical lens.

In an embodiment of the invention, the first lens group and the second lens group is a focusing group, and the third lens group is a fixed group.

The embodiment of the invention has at least one of the following advantages. The lens module in the embodiment of the invention has the first sub-lens group having a negative refractive power closest to the magnified side, and a surface of the lens closest to the magnified side and facing the magnified side is a concave surface. Hence, not only is the field of view (FOV) of the lens module expanded, but the distortion and image aberration generated by the second lens group can also be corrected, so that the lens module has better optical quality. In addition, the lens module may focus by moving the positions of the first lens group and the second lens group relative to the third lens group, and the main light beam near the reduced side of the lens module is approximately parallel to the optical axis by adopting the third lens group. Thus, the lens module is capable of achieving at least one of the following effects: reducing aberration, color aberration, and distortion, enhancing imaging quality, and reducing dimension.

Other objectives, features and advantages of the present invention will be further understood from the further technology features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
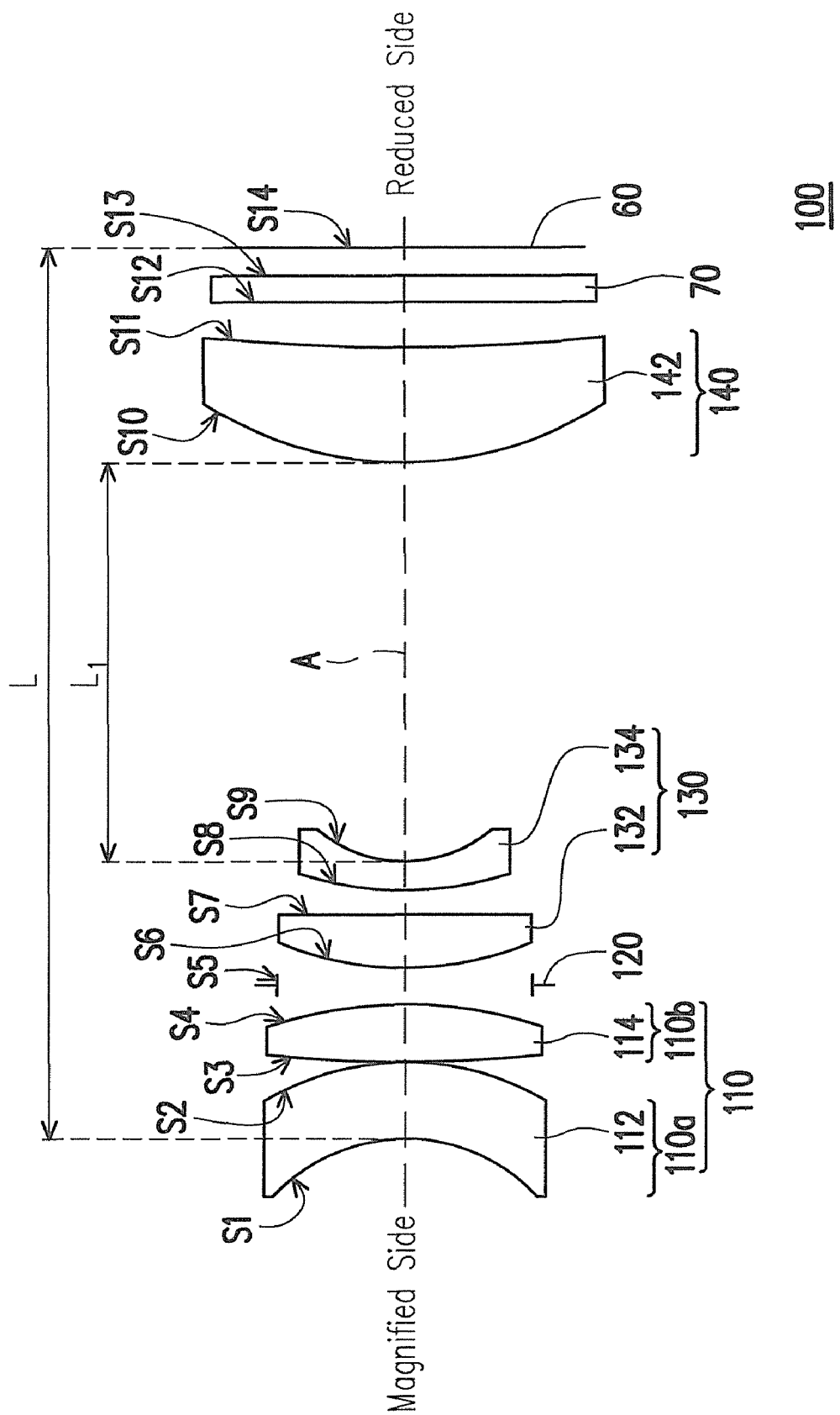
FIG. 1 is a schematic structural view of a lens module according to an embodiment of the invention.

FIG. 1 is a schematic structural view of a lens module according to an embodiment of the invention. Referring to FIG. 1, a lens module 100 of the embodiment is disposed between a magnified side and a reduced side, and includes a first lens group 110, an aperture stop 120, a second lens group 130, and a third lens group 140 arranged in sequence from the magnified side to the reduced side. In the embodiment, the first lens group 110, the second lens group 130, and the third lens group 140 are positive refractive power, negative refractive power and positive refractive power respectively.

Specifically, the first lens group 110 includes a first sub-lens group 110a and a second sub-lens group 110b arranged in sequence from the magnified side to the reduced side, and refractive powers of the first sub-lens group 110a and the second sub-lens group 110b are, for example, negative and positive sequentially. The first sub-lens group 110a has a first lens 112, and a surface S1 of the first lens 112 facing the magnified side is a concave surface. The second sub-lens group 110b has a second lens 114. The second lens group 130 includes a third lens 132 and a fourth lens 134 arranged in sequence from the magnified side to the reduced side, and refractive powers of the third lens 132 and the fourth lens 134 are, for example, positive and negative sequentially. Herein, the third lens group 140 is consisted of a fifth lens 142, and a refractive power of the fifth lens 142, for example, is positive. Specifically, in the embodiment, the first lens 112 is a convex-concave lens with a concave surface facing the magnified side and a convex surface facing the reduced side. Moreover, the first lens 112 has a negative refractive power. A surface S6 of the second lens group 130 closest to the magnified side is a convex surface. The third lens 132 is a concave-convex lens with a convex surface facing the magnified side and a concave surface facing the reduced side. The fourth lens 134 is a convex-concave lens with a concave surface facing the reduced side and a convex surface facing the magnified side. A surface S10 of the fifth lens 142 facing the magnified side is a convex surface. However, the invention is not limited thereto. In other embodiment, the lens can be in shapes not illustrated above depending on actual requirements.

In the embodiment, in order for the lens module 100 to be compact and miniaturized, at least one lens for consisting the lens module 100 is an aspherical lens. Thus, less lenses (i.e. five lenses) are used for consisting a lens module having a telecentric system while also having superior imaging quality. Here, the telecentric system is adopted to enhance light source utilization and frame luminance uniformity. Consequently, the main light beam at the reduced side of the lens module 100 and the optical axis A thereof are as parallel to each other as possible; that is, the lens module 100 has an optical feature of a telecentric lens. Particularly, the first lens 112 and the fourth lens 134 illustrated in the lens module 100 of the embodiment are each an aspherical lens; however, the invention is not limited thereto. In another embodiment, other lenses in the lens module can also be aspherical lenses. In addition, when the lens adopts an aspherical design, the lens can be made of glass. The lens can also be made of plastic, so as to save fabrication cost. The parameter and design of the aspherical lens are to be illustrated in the following.

Generally, an image processing device 60 is disposed at the reduced side. In the embodiment, the image processing device 60, for example, is a light valve. The light valve, for example, is a digital micro-mirror device (DMD), a liquid-crystal-on-silicon panel (LCOS panel), or a transmissive liquid crystal panel (transmissive LCD). Besides, in the embodiment, the lens module 100 is adapted to image an image provided by the image processing device 60 at the magnified side.

In the embodiment, since the first sub-lens group 110a has a negative refractive power, not only can the lens module 100 obtain a wide-viewing angle, but the distortion phase difference generated by the second lens group 120 can also be corrected. When the surface S1 of the first lens 112 facing the magnified side is a concave surface, not only is the field of view expanded, but the dimension of the lens is also reduced, and the miniaturization of the lens module 100 is facilitated. Additionally, in the second sub-lens group 110b, the second lens 114 is near the aperture stop 120, and the surface S4 of the second lens 114 facing the reduced side is a convex surface; and in the second lens group 130, the third lens 132 is near the aperture stop 120 and the surface S6 of the third lens 132 facing the magnified side is a convex surface. Since both of the surface S4 and the surface S6 are convex surfaces, the second lens 114 and the third lens 132 are thus as close to each other as possible. As a consequence, a total length L of the lens module 100 is reduced effectively, such that the lens module 100 is miniaturized.

In the embodiment, in order for a main light beam near the reduced side in the lens module 100 to be approximately parallel to the optical axis A, i.e. the lens module 100 is similar to a telecentric lens, the third lens group 140 of the lens module 100 may be designed to have a positive refractive power. In addition, the fourth lens 134 of the second lens group 130 is near the third lens group 140. When a surface S9 of the fourth lens 134 facing the reduced side is designed to be a concave surface, the dimension of the fourth lens 134 is smaller and the distance between the second lens group 130 and the third lens group 140 is a longer for disposing devices (i. a reflection mirror) required for the projection system.

Further, in order to maintain miniaturized dimension and superior optical imaging quality, the lens module 100 satisfies the following condition while being miniaturized.

$$0.4 < L_1/f < 1.2 \qquad \text{(condition I)}$$

Here, f is an effective focal length (EFL) of the lens module 100 and $L_1$ is a distance from the surface S9 to the surface S10. In the lens module 100, when $L_1/f<0.4$, then the distance from the second lens group 130 to the third lens group 140 is too short, such that devices required for projection cannot be disposed between the second lens group 130 to the third lens group 140 and the fourth lens 134 near the third lens group 140 in the second lens group 130 cannot be miniaturized as the dimension of the fourth lens 134 increases. When $1.2<L_1/f$, the refractive power of the fourth lens 134 near the third lens group 140 in the second lens group 130 decreases, such that the aberration generated by other lenses cannot be corrected.

Specifically, in order for the lens module 100 to represent a better optical imaging quality, the lens module satisfies the following condition II depending on actual circumstances:

$$0.7 < (|R_1|+R_2)/(|R_1|-R_2) < 4 \qquad \text{(condition II)}$$

Here, $R_1$ is a curvature radius of the surface S8 of the fourth lens 134 facing the magnified side, and $R_2$ is a curvature radius of the surface S9 of the fourth lens 134 facing the reduced side. When condition II is satisfied, the lens module has a better performance in correcting an off-axis aberration, and particularly in correcting field curvature and coma aberration. For instance, in the lens module 100, when $(|R_1|+R_2)/(|R_1|-R_2)>4$, the surface S9 of the fourth lens 134 facing the reduced side has a larger aberration, and the off-axis aberration, especially the field curvature, is more difficult to correct. When $(|R_1|+R_2)/(|R_1|-R_2)<0.7$, the negative refractive power of the fourth lens 134 near the third lens group 140 in the second lens group 130 is smaller and insufficient to correct the aberration.

Moreover, in order to enhance the ability in correcting color aberration, the lens module 100 may satisfy the following condition III:

$$20 < v_P - v_N < 30 \qquad \text{(condition III)}$$

Herein, $v_P$ is an Abbe number of the third lens 132 close to the aperture stop 120 in the second lens group 130, and $v_N$ is an Abbe number of the fourth lens 134 close to the third lens group 140 in the second lens group 130. For example, in the lens module 100, when $v_P - v_N \leq 20$, then the Abbe numbers of the third lens 132 and the fourth lens 134 are too close, such that the correction of the lateral color aberration of the lens module 100 is more difficult; when $v_P - v_N \geq 37$ then the correction of the longitudinal color aberration of the lens module 100 is more difficult.

In addition, the lens module 100 satisfies the following condition IV:

$$0.5 < |f_{SG1}|/f < 4.1 \text{ and } 0.3 < f_{SG2}/f < 0.95 \qquad \text{(condition IV)}$$

Here, f is the EFL of the lens module 100, $f_{SG1}$ is an EFL of the first sub-lens group 110a, and $f_{SG2}$ is an EFL of the second sub-lens group 110b. Particularly, in the lens module 100, when $|f_{SG1}|/f<0.5$ and $f_{SG2}/f<0.3$, then the refractive powers of the first sub-lens group 110a and the second sub-lens group 110b are increased. Accordingly, even though the total length L of the lens module 100 is shortened to attain a compact optical system, the performance on the coma aberration and spherical aberration are enlarged. When the lens module 100 satisfies $|f_{SG1}|/f>4.1$ and $f_{SG2}/f>0.95$, the refractive powers of the first sub-lens group 110a and the second sub-lens group 110b are decreased, so that the aberration is easily corrected. However, the total length L of the lens module 100 is increased.

Similarly, the lens module 100 satisfies the following condition V:

$$0.5<f_3/f<2 \text{ and } 0.35<|f_4|/f<0.9 \quad \text{(condition IV)}$$

Here, $f_3$ is an EFL of the third lens 132 close to the aperture stop 120 in the second lens group 130, $f_4$ is an EFL of the fourth lens 134 close to the third lens group 140 in the second lens group 130, and f is the EFL of the entire lens module 100. Particularly, in the lens module 100, when $f_3/f<0.5$ and $|f_4|/f<0.35$, then the refractive powers of the third lens 132 and the fourth lens 134 are increased. Accordingly, even though the total length L of the lens module 100 is shortened to attain a compact optical system, the field curvature and an astigmatism aberration are enlarged. When the lens module 100 satisfies $2<f_3/f$ and $0.9<|f_4|/f$, the refractive powers of the third lens 132 and the fourth lens 134 are decreased, so that the aberration is easily corrected. However, the total length L of the lens module 100 is increased.

Besides, in order to make a main light beam near the reduced side in the lens module 100 approximately parallel to the optical axis A, i.e. the lens module 100 is similar to a telecentric lens, the third lens group 140 of the lens module 100 may be designed to have positive refractive power, and the lens module 100 may satisfy the following condition VI:

$$0.8<f_{G3}/f<2 \quad \text{(condition VI)}$$

Herein, f is the EFL of the lens module 100, and $f_{G3}$ is an EFL of the third lens group 140. For instance, in the lens module 100, when $2<f_{G3}/f$, then the refractive power of the third lens group 140 is insufficient, so that the main light beam near the reduced side in the lens module 100 is not approximately parallel to the optical axis A. To achieve the foregoing, the dimension of the fourth lens 134 close to the third lens group 140 in the second lens group 130 is increased, but the increase of the dimension of the fourth lens 134 leads to higher fabrication cost and failure in miniaturization. When $f_{G3}/f<0.8$, then the refractive force of the third lens group 140 is too large, such that the distance $L_1$ from the second lens group 130 to the third lens group 140 is too short and insufficient for disposing the devices (i.e. a reflector) required for projection.

Furthermore, the lens module is not required to satisfy all of the conditions listed above during the design. That is, the conditions listed above are satisfied optionally depending on needs of the optical imaging quality.

Another embodiment of the lens module 100 in the invention is described below, and the invention is not limited to the data listed in Table 1. It should be known to those ordinary skilled in the art that various modifications and variations can be made to the parameter or the configuration of the invention without departing from the scope or spirit of the invention.

TABLE 1

| Surface | Curvature radius (mm) | Distance (mm) | Index of Refraction | Abbe Number | Notes |
|---|---|---|---|---|---|
| S1 | −3.59882 | 1.946158 | 1.631919 | 23.41612 | First Lens |
| S2 | −4.83673 | 0.066615 | | | |
| S3 | 60.59833 | 1.454517 | 1.834 | 37.16049 | Second Lens |
| S4 | −13.0373 | 0.050013 | | | |
| S5 | Infinity | 0 | | | Aperture Stop |
| S6 | 10.16985 | 1.342347 | 1.772499 | 49.59837 | Third Lens |
| S7 | 163.0793 | 0.60942 | | | |
| S8 | 7.151089 | 0.850136 | 2.019603 | 21.45252 | Fourth Lens |
| S9 | 3.495621 | 11.616 | | | |
| S10 | 10.65 | 3 | 1.620411 | 60.28958 | Fifth Lens |
| S11 | 60 | 1.190511 | | | |
| S12 | Infinity | 0.65 | 1.508469 | 61.1878 | Cover Glass |
| S13 | Infinity | 0.709 | | | |
| S14 | Infinity | | | | |

In Table 1, the distance refers to a linear distance between two neighboring surfaces along the optical axis A. For example, the distance of the surface S3 is the linear distance between the surface S3 and the surface S4 along the optical axis A. The thickness, index of refraction, and Abbe number corresponding to each of the lenses listed in the "Notes" column can be found in the corresponding values for the distance, index of refraction, and Abbe number from each row. Moreover, in Table 1, the surfaces S1 and S2 are two surfaces of the first lens 112, the surfaces S3 and S4 are two surfaces of the second lens 114, the surface S5 is the aperture stop 120, the surfaces S6 and S7 are two surfaces of the third lens 132, the surfaces S8 and S9 are two surfaces of the fourth lens 134, and the S10 and S11 are two surfaces of the fifth lens 142. The surfaces S12 and S13 are two surfaces of a cover glass 70. The cover glass 70 uses to cover the light valve 60.

The radius of curvature, the distance, and other parameters are shown in Table 1, and are not further described herein.

Figure 2A:
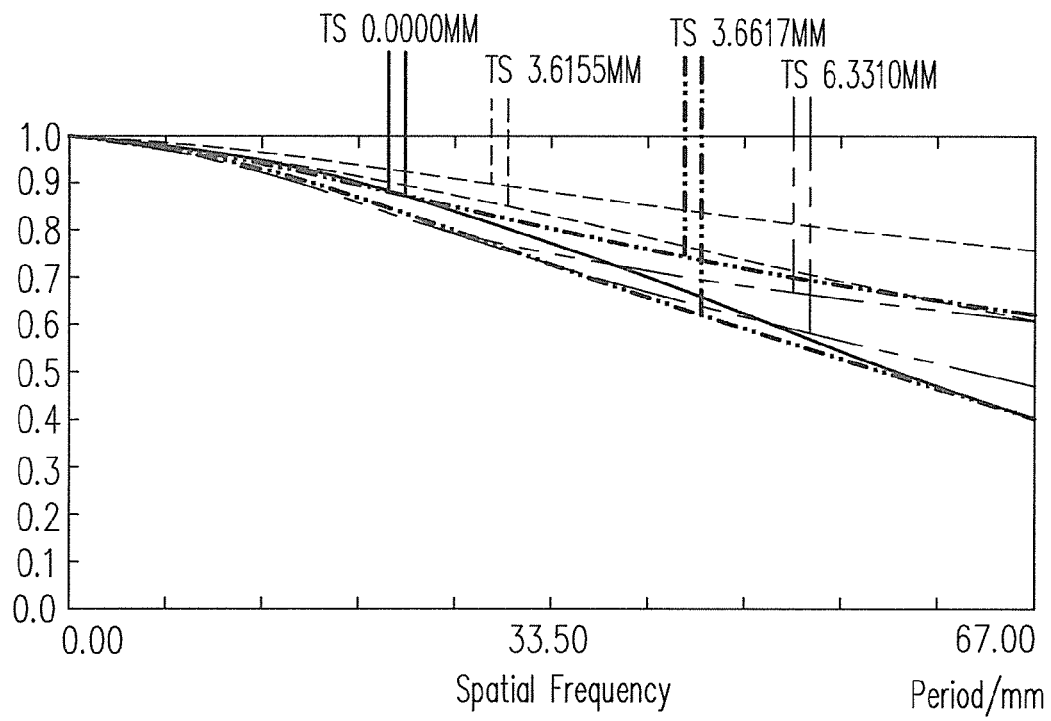
FIGS. 2A through 2D are diagrams showing the optical simulation data of imaging of the lens module 100 in FIG. 1.
Figure 2B:
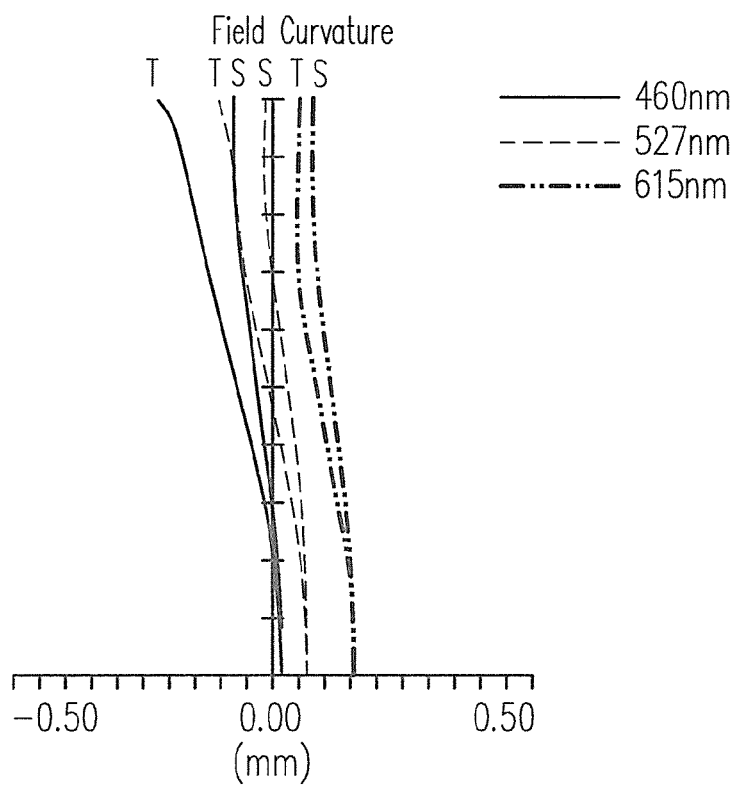
Figure 2C:
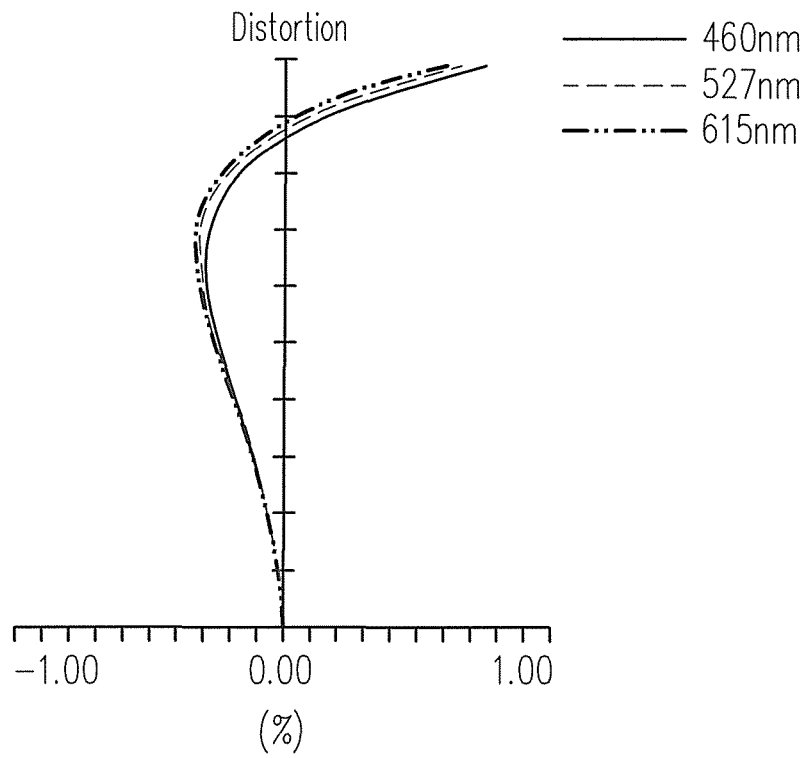
Figure 2D:
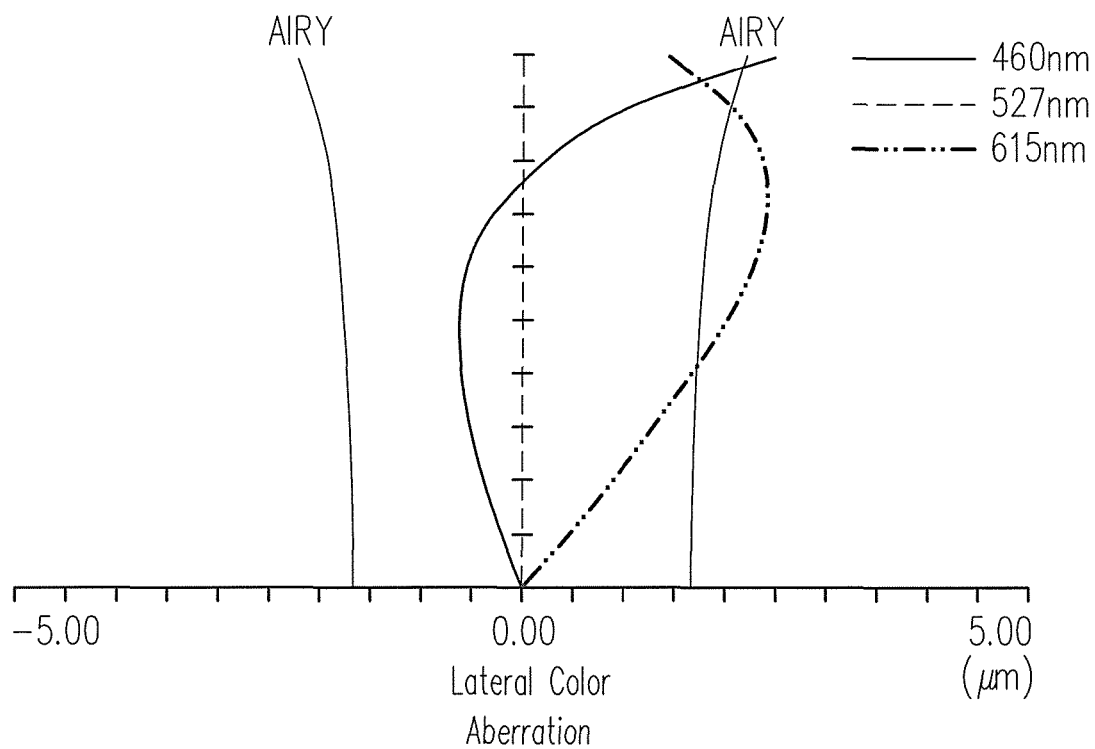

Referring to FIGS. 2A through 2D, FIG. 2A is a modulation transfer function (MTF) graph. In FIG. 2A, a transverse axis is a spatial frequency in cycles per millimeter, and a longitudinal axis is a modulus of the optical transfer function (OTF). FIG. 2A is a simulation data diagram obtained with a light having three wavelengths of 460 nm, 527 nm, and 615 nm. Moreover, FIG. 2B and FIG. 2C respectively show graphics of a field curvature and a distortion, and are simulated with a light having three wavelengths of 460 nm, 527 nm, and 615 nm. FIG. 2D is a lateral color aberration diagram and is a simulation data diagram obtained with a light having three wavelengths of 460 nm, 527 nm, and 615 nm. Since all the graphics shown in FIGS. 2A through 2D fall within a standard range, the lens module 100 of the embodiment has good imaging quality.

Additionally, since the surfaces S1, S2, S8, S9 are aspherical surfaces, and an equation of the aspherical surfaces is represented as follows:

$$Z(h) = \frac{(1/r)h^2}{1 + \sqrt{1-(1+k)(h/r)^2}} + C_2 h^2 + C_2 h^4 + C_2 h^8 + C_2 h^{10} + C_2 h^{12} + C_2 h^{14} + C_2 h^{16}$$

Herein, Z is a quantity of shifting of a direction of the optical axis A. Further, r is a radius of an osculating sphere, that is, a curvature radius near the optical axis A (such as the curvature radii of the surfaces S1, S2, S8, S9 in the table). k is a conic constant. h is a vertical height from the periphery of aspherical lens to the optical axis A, that is, the height from the center of the lens to the edge of the lens. As illustrated in the equation, different values of Z are acquired using different values of h. C2~C16 are asphere coefficients. The asphere coefficients and k values of the surfaces S1, S2, S8, S9 are shown in Table 2.

TABLE 2

|  | S1 | S2 | S8 | S9 |
|---|---|---|---|---|
| k | −1.2629 | −4.34425 | 0 | 0.070606 |
| $C_2$ | 0 | 0 | 0 | 0 |
| $C_4$ | 1.2841E−03 | −1.0204E−03 | −1.9043E−03 | −7.1111E−03 |
| $C_6$ | 5.2238E−05 | 1.9378E−04 | 7.5376E−05 | 5.0144E−04 |
| $C_8$ | −4.9978E−06 | −1.2096E−05 | −5.1103E−05 | −2.8553E−04 |
| $C_{10}$ | 1.1414E−07 | 4.9715E−07 | 1.3235E−05 | 7.6527E−05 |
| $C_{12}$ | 2.5887E−09 | −1.2050E−08 | −1.5958E−06 | −1.1521E−05 |
| $C_{14}$ | −1.1938E−10 | 1.2804E−10 | 9.4649E−08 | 8.8624E−07 |
| $C_{16}$ | 0 | 0 | −2.2435E−09 | −2.8534E−08 |

Some simulation parameters, such as the EFL, the FOV, the telecentric angle, and the simulation parameters of the lens module 100 satisfying the conditions I to VI are listed in Table 3.

TABLE 3

| Items | Value |
|---|---|
| EFL | 15.0831 |
| FOV | 37.2° |
| Telecentric angle | 0.71° |
| $L_1/f$ | 0.77 |
| $(|R_1| + R_2)/(|R_1| − R_2)$ | 2.918 |
| $v_P − v_N$ | 28.15 |
| $|f_{SG1}|/f$ | 3.769 |
| $f_{SG2}/f$ | 0.852 |
| $f_3/f$ | 0.921 |
| $|f_4|/f$ | 0.5 |
| $f_{G3}/f$ | 1.344 |

In the embodiment, the distortion aberration generated by the second lens group 130 can be corrected because of the first sub-lens group 100a with the negative refractive power in the first lens group 110. Moreover, when the surface S1 of the first lens 112 facing the magnified side is a concave surface, the dimension of the first lens 112 can then be reduced. When the surface S4 of the second lens 114 facing the reduced side is a convex surface and the surface S6 of the third lens 132 facing the magnified side is also a convex surface, the dimension of the lens module can then be reduced for the lens module to be miniaturized. The third lens group 140 has a positive refractive power, so that the main light beam near the reduced side of the lens module 100 is approximately parallel to the optical axis A. Therefore, the lens module 100 has the advantages of small image aberration of imaging, low degree of distortion, and so on. Further, at least a portion of the lenses in the lens module 100 not only adopts aspherical lenses to reduce aberration for enhancing imaging quality, but the number of lenses used is also decreased for further reducing the dimension of the lens module 100. Besides, the position of the third lens group 140 relative to the lens module 100 is fixed, and the lens module 100 thus focuses by moving the positions of the first lens group 110 and the second lens group 130 relative to the third lens group 140.

Figure 3:
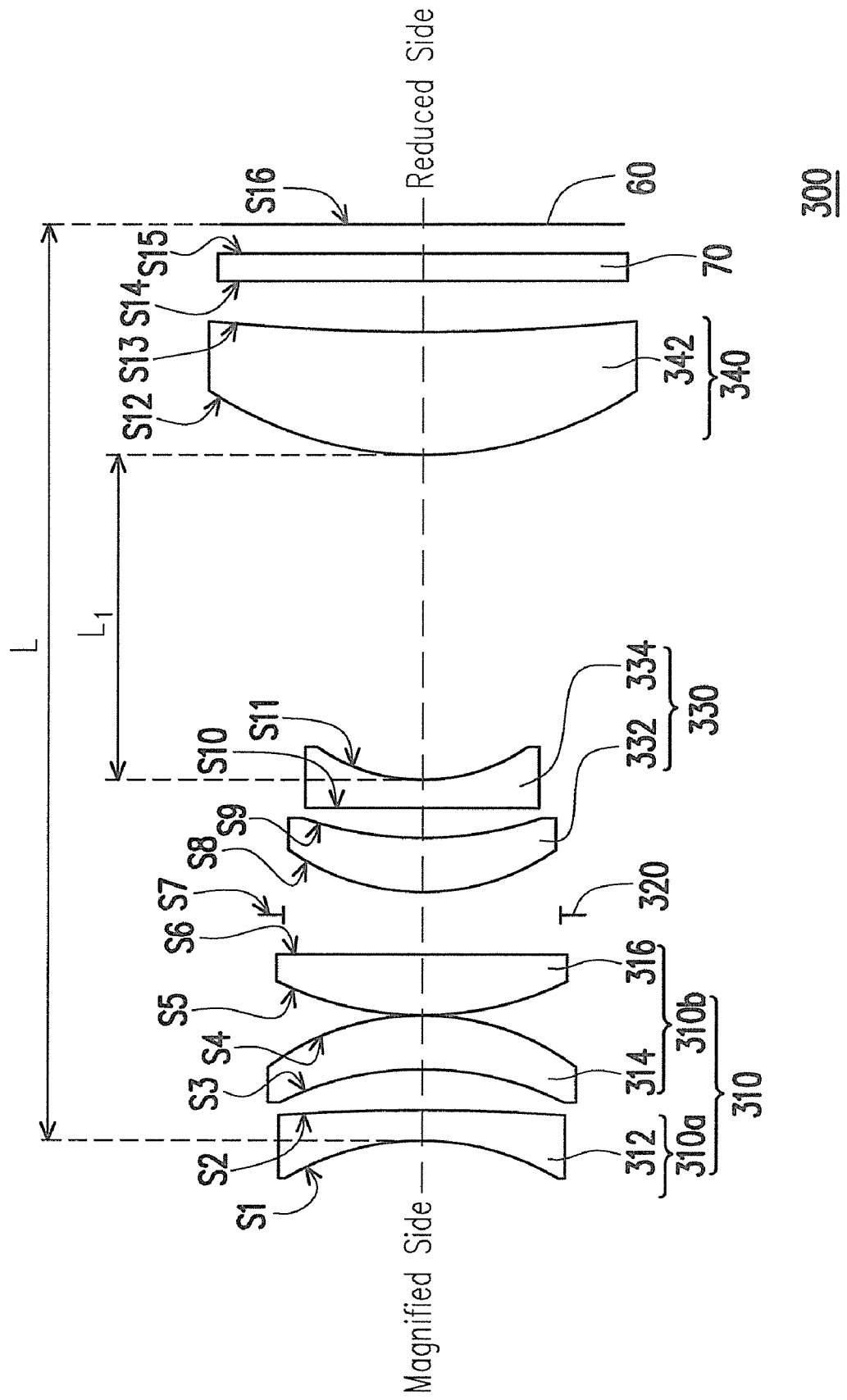
FIG. 3 is a schematic structural view of a lens module according to another embodiment of the invention.

Referring to FIG. 3, a lens module 300 of the embodiment is similar to the lens module 100, and the main difference therebetween lies in that a second sub-lens group 310b in the lens module 300 further includes a sixth lens 316 disposed between a second lens 314 and an aperture stop 320. In the embodiment, the second lens 314 and the sixth lens 316 constitute a structure similar to the second sub-lens groups 310b having the positive refractive power described above. In details, in the second sub-lens group 310b, each of the second lens 314 and the sixth lens 316 has a positive refractive power. However, the second lens 314 is a concave-convex lens with a convex surface facing the reduced side and a concave surface facing the magnified side, and the sixth lens 316 is a biconvex lens. In the embodiment, a first lens 312 is a convex-concave lens with a concave surface facing the reduced side and a convex surface facing the magnified side. Moreover, the first lens 312 has a negative refractive power. A third lens 332 is a concave-convex lens with a convex surface facing the magnified side and a concave surface facing the reduced side. The third lens 332 has a positive refractive power. A fourth lens 334 is a convex-concave lens with a concave surface facing the reduced side and a convex surface facing the magnified side. The fourth lens 334 has a negative refractive power. A fifth lens 342 is a concave-convex lens with a convex surface facing the reduced side and a concave surface facing the magnified side. The fifth lens 342 has a positive refractive power.

Similarly, at least one of the first lens 312, the second lens 314, the third lens 332, the fourth lens 334, the fifth lens 342, and the sixth lens 316 in the lens module 300 may adopt design of aspherical lens. As a consequence, the overall imaging quality is enhanced and the overall dimension of the lens module 300 is reduced. In the lens module 300 of the embodiment, the third lens 332 and the sixth lens 316 are each an aspherical lens for illustration; however, the invention is not limited thereto and can be adjusted according to demand and design of the user.

Since the lens module 300 and the lens module 100 have similar structures, the main difference between the lens module 300 and the lens module 100 is: the methods of constituting the second sub-lens group having positive refractive power. Thus, the lens module 300 also has the advantages as those described in the lens module 100. In other words, when the lens module 300 satisfies at least one of the foregoing conditions I to VI, the overall dimension can be reduced and the optical quality can be enhanced.

An embodiment of the lens module 300 in the invention is described below. However, the invention is not limited to the data listed in Table 4. It should be known to those ordinary skilled in the art that various modifications and variations can be made to the parameter or configuration of the invention without departing from the scope or spirit of the invention.

TABLE 4

| Surface | Curvature radius (mm) | Distance (mm) | Index of Refraction | Abbe Number | Notes |
|---|---|---|---|---|---|
| S1 | −7.56726 | 0.774597 | 1.69592 | 32.73821 | First Lens |
| S2 | −49.3447 | 1.068661 | | | |
| S3 | −8.85348 | 1.277076 | 1.804581 | 45.99062 | Second Lens |
| S4 | −6.7022 | 0.05 | | | |
| S5 | 10.89912 | 1.5055 | 1.806073 | 40.70956 | Sixth Lens |
| S6 | −25.2964 | 0 | | | |
| S7 | Infinity | 0.01962 | | | Aperture Stop |
| S8 | 7.321552 | 1.415775 | 1.7746 | 44.57834 | Third Lens |
| S9 | 12.7861 | 0.739861 | | | |
| S10 | 76.02054 | 0.782778 | 1.84241 | 22.95441 | Fourth Lens |
| S11 | 5.662418 | 9.795562 | | | |
| S12 | 10.6557 | 2.982835 | 1.67511 | 60.28958 | Fifth Lens |
| S13 | 60.51079 | 1.325 | | | |
| S14 | Infinity | 0.65 | 1.508469 | 61.1878 | Cover Glass |
| S15 | Infinity | 0.709 | | | |
| S16 | Infinity | | | | |

In Table 4, the distance refers to a linear distance between two neighboring surfaces along the optical axis A. For example, the distance of the surface S3 is the linear distance between the surface S3 and the surface S4 along the optical axis A. The thickness, the index of refraction, and the Abbe number corresponding to each of the lenses listed in the "Notes" column can be found in the corresponding values for the distance, the index of refraction, and the Abbe number from each row. Moreover, in Table 4, the surfaces S1 and S2 are two surfaces of the first lens 312, the surfaces S3 and S4 are two surfaces of the second lens 314, the surfaces S5 and S6 are two surfaces of the sixth lens 316, the surface S7 is an aperture stop 350, the surfaces S8 and S9 are two surfaces of the third lens 332, surfaces S10 and S11 are two surfaces of the fourth lens 334, and S12 and S13 are two surfaces of the fifth lens 342. The surfaces S14 and S15 are two surfaces of the cover glass 70 used in the light valve 60.

In the lens module 300, the third lens 332 and the sixth lens 316 adopt the design of the aspherical lenses for illustration; thus, the surfaces S5, S6, S8, S9 are aspherical surfaces, and an equation of the aspherical surfaces is presented below:

$$Z(h) = \frac{(1/r)h^2}{1 + \sqrt{1 - (1+k)(h/r)^2}} + C_2 h^2 + C_2 h^4 + C_2 h^8 + C_2 h^{10} + C_2 h^{12} + C_2 h^{14} + C_2 h^{16}$$

Herein, Z is the quantity of shifting of a direction of the optical axis A. Further, r is a radius of an osculating sphere, that is, a curvature radius near the optical axis A (such as the curvature radii of the surfaces S1, S2, S8, S9 in the table). k is a conic constant. h is a vertical height from the peripheral of aspherical lens to the optical axis A, that is, the height from the center of the lens to the edge of the lens. As illustrated in the equation, different values of Z are acquired using different values of h. C2~C16 are asphere coefficients. The asphere coefficients and k values of the surfaces S5, S6, S8, S9 are shown in Table 5.

TABLE 5

| | S1 | S2 | S8 | S9 |
|---|---|---|---|---|
| k | −19.3573 | −69.443 | −4.77467 | −96.2801 |
| $C_2$ | 0 | 0 | 0 | 0 |
| $C_4$ | 1.5405E−03 | 2.2331E−03 | 3.6161E−03 | 3.7748E−03 |
| $C_6$ | −1.3100E−05 | −1.1417E−04 | −5.7640E−06 | −6.0345E−04 |
| $C_8$ | 4.6944E−06 | −8.3352E−08 | −2.8501E−05 | 1.3846E−04 |

TABLE 5-continued

| | S1 | S2 | S8 | S9 |
|---|---|---|---|---|
| $C_{10}$ | −4.3711E−07 | 7.0387E−07 | 4.6477E−06 | −2.2658E−05 |
| $C_{12}$ | −3.5285E−09 | −4.9956E−08 | −3.3397E−07 | 2.5427E−06 |
| $C_{14}$ | 2.5518E−09 | 9.8620E−10 | 1.5224E−08 | −1.5636E−07 |
| $C_{16}$ | −1.0934E−10 | −1.5635E−11 | −4.8052E−10 | 3.6694E−09 |

Some simulation parameters, such as the EFL, the FOV, the telecentric angle, and the simulation parameters of the lens module 300 satisfying the conditions I through VI are listed in Table 6.

TABLE 6

| Items | Value |
|---|---|
| EFL | 14.051 |
| FOV | 40.33 |
| Telecentric angle | 0.97 |
| $L_1/f$ | 0.697 |
| $(|R_1| + R_2)/(|R_1|) - R_2)$ | 1.161 |
| $v_P - v_N$ | 21.624 |
| $|f_{SG1}|/f$ | 0.911 |
| $f_{SG2}/f$ | 0.482 |
| $f_3/f$ | 1.402 |
| $|f_4|/f$ | 0.511 |
| $f_{G3}/f$ | 1.323 |

In conclusion, the embodiment or the embodiments of the invention may include at least one of the following advantages. Since at least a portion of the lenses in the lens module adopts aspherical lenses, not only can the lens module represents better imaging quality (i.e. correcting aberration), but the number of lenses used is also decreased for further reducing the dimension of the lens module. Also, the lens module is capable of achieving at least one of the following effects: reducing aberration, color aberration and distortion, and enhancing imaging quality. Furthermore, the first sub-lens group closest to the magnified side in the lens module has the negative refractive power and the surface of the lens closest to the magnified side facing the magnified side is a concave surface, so that the FOV of the lens is expanded and the distortion aberration generated by the second lens group is corrected so as to obtain superior optical quality. In addition, the lens module focuses by moving the positions of the first lens group and the second lens group relative to the third lens group, and the main light beam near the reduced side of the lens module is approximately parallel (about within 3°) to the optical axis by adopting the third lens group. Therefore, the above-described embodiments of the invention provide the lens module which has reduced dimension and superior optical characteristics.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens module, comprising:
   a first lens group disposed between a magnified side and a reduced side, having a positive refractive power, and comprising in sequence from the magnified side to the reduced side: a first sub-lens group having a negative refractive power and a second sub-lens group having a positive refractive power, wherein the first sub-lens group comprises a first lens and the second sub-lens group comprises a second lens, and a first surface of the first lens facing the magnified side is a concave surface;
   a second lens group disposed between the first lens group and the reduced side, having a negative refractive power, and comprising in sequence from the magnified side to the reduced side: a third lens having a positive refractive power and a fourth lens having a negative refractive power, wherein a surface closest to the reduced side in the second lens group is a second surface;
   a third lens group disposed between the second lens group and the reduced side, having a positive refractive power, and comprising a fifth lens, wherein a surface closest to the magnified side in the third lens group is a third surface; and
   an aperture stop disposed between the second sub-lens group and the second lens group,
   wherein an effective focal length of the lens module is f, a distance from a center of the second surface to a center of the third surface is $L_1$, and the lens module satisfies $0.4 < L_1/f < 1.2$.

2. The lens module of claim 1, wherein the second surface is a concave surface.

3. The lens module of claim 1, wherein at least one of the first lens, the second lens, the third lens, the fourth lens, and the fifth lens is an aspherical lens.

4. The lens module of claim 1, wherein a curvature radius of a surface of the fourth lens facing the magnified side is $R_1$, a curvature radius of a surface of the fourth lens facing the reduced side is $R_2$, and the lens module satisfies $0.7 < (|R_1| + R_2)/(|R_1| - R_2) < 4$.

5. The lens module of claim 1, wherein the third lens has an Abbe number $v_P$, the fourth lens has an Abbe number $v_N$, and the lens module satisfies $20 < v_P - v_N < 30$.

6. The lens module of claim 1, wherein an effective focal length of the first sub-lens group is $f_{SG1}$, an effective focal length of the second sub-lens group is $f_{SG2}$, and the lens module satisfies $0.5 < |f_{SG1}|/f < 4.1$ and $0.3 < f_{SG2}/f < 0.95$.

7. The lens module of claim 1, wherein an effective focal length of the third lens is $f_3$, an effective focal length of the fourth lens is $f_4$, and the lens module satisfies $0.5 < f_3/f < 2$ and $0.35 < |f_4|/f < 0.9$.

8. The lens module of claim 1, wherein an effective focal length of the third lens group is $f_{G3}$, and the lens module satisfies $0.8 < f_{G3}/f < 2$.

9. The lens module of claim 1, wherein the first lens has a negative refractive power and the second lens has a positive refractive power.

10. The lens module of claim 1, wherein a surface of the first lens-group closest to the magnified side is a concave surface and a surface of the second lens-group closest to the magnified side is a convex surface.

11. The lens module of claim 1, wherein the fifth lens has a positive refractive power.

12. The lens module of claim 11, wherein a surface of the fifth lens facing the magnified side is a convex surface.

13. The lens module of claim 1, wherein the second sub-lens group further comprises a sixth lens disposed between the second lens and the aperture stop.

14. The lens module of claim 13, wherein the first lens has a negative refractive power, the second lens has a positive refractive power, and the sixth lens has a positive refractive power.

15. The lens module of claim 14, wherein a surface of the sixth lens facing the magnified side is a convex surface.

16. The lens module of claim 13, wherein at least one of the first lens, the second lens, the third lens, the fourth lens, the fifth lens, and the sixth lens is an aspherical lens.

17. The lens module of claim 1, wherein a surface of the third lens facing the magnified side is a convex surface and a surface of the fourth lens facing the reduced side is a concave surface.

18. The lens module as of claim 1, wherein the first lens group and the second lens group is a focusing group, and the third lens group is a fixed group.

* * * * *